United States Patent [19]

Roy

[11] Patent Number: 5,378,288
[45] Date of Patent: * Jan. 3, 1995

[54] METHOD FOR THE DISPOSAL OF FOAM, IN PARTICULAR OF FIRE EXTINGUISHING FOAM

[75] Inventor: Rainer Roy, Leichlingen, Germany

[73] Assignee: Total Walther Feuerschutz GmbH, Köln, Germany

[*] Notice: The portion of the term of this patent subsequent to Jul. 7, 2009 has been disclaimed.

[21] Appl. No.: 845,175

[22] Filed: Mar. 3, 1992

Related U.S. Application Data

[63] Continuation-in-part of Ser. No. 585,244, Sep. 19, 1990, Pat. No. 5,127,959.

[30] Foreign Application Priority Data

Sep. 20, 1989 [DE] Germany ............................ 3931311
Mar. 4, 1991 [DE] Germany ............................ 4106798

[51] Int. Cl.6 .................................................. B08B 5/04
[52] U.S. Cl. .......................................... 134/21; 134/32;
134/33; 55/438; 55/459.1; 210/787; 95/242

[58] Field of Search ............... 134/21, 32; 55/45, 438, 55/459.1; 210/787

[56] References Cited

U.S. PATENT DOCUMENTS

| 4,746,440 | 5/1988 | Seeger | 210/703 |
| 4,874,589 | 10/1989 | Görlich | 210/673 |
| 4,974,618 | 12/1990 | Nysted | 134/21 |

FOREIGN PATENT DOCUMENTS 0925371 7/1982 U.S.S.R. ............................ 55/438

Primary Examiner—Richard O. Dean
Assistant Examiner—Zeinab El-Arini
Attorney, Agent, or Firm—Horst M. Kasper

[57] ABSTRACT

A method and a device is provided for the discharge of a foam, in particular of a high-expansion and/or medium-expansion foam useful in connection with fire-extinguishing and the like. The foam is furnished with an antifoaming agent water mixture, is suctioned in by a fan blower and is disintegrated. The resultant solution is collected via a separator in a subsequently disposed collection container, and is further transported with a pump.

12 Claims, 1 Drawing Sheet

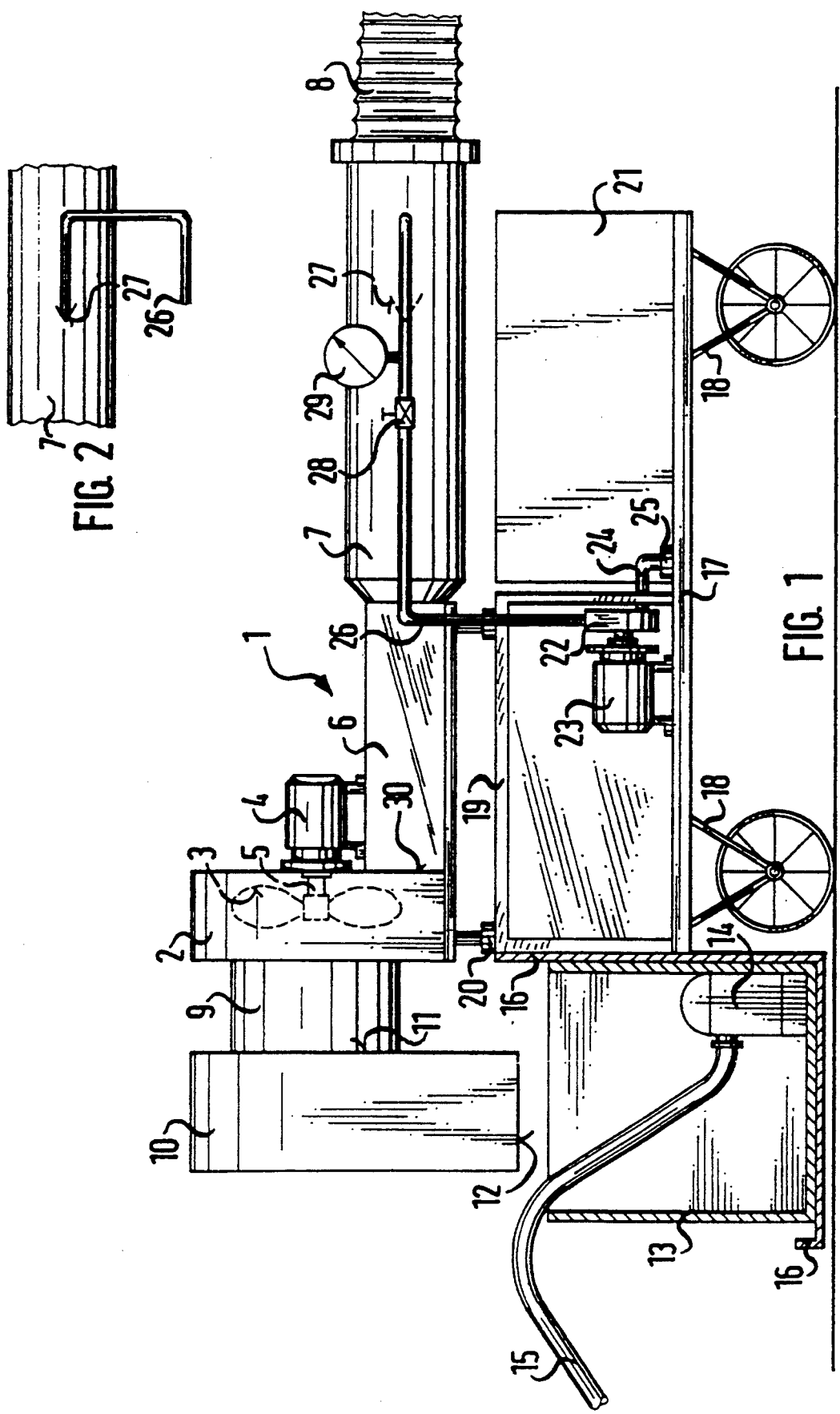

METHOD FOR THE DISPOSAL OF FOAM, IN PARTICULAR OF FIRE EXTINGUISHING FOAM

CROSS-REFERENCE TO RELATED APPLICATIONS

This application is a continuation-in-part application of another application filed Sep. 19, 1990 and bearing Ser. No. 07/585,244 now U.S. Pat. No. 5,127,959. The entire disclosure of this latter application, including the drawings thereof, is hereby incorporated in this application as if fully set forth herein.

BACKGROUND OF THE INVENTION

1. Field of the Invention

The present invention relates to a method and device for the disposal of a high-expansion foam and/or a medium-expansion foam or the like, usable in connection with fire extinguishing, where the foam is suctioned with a fan blower, wherein the foam passes through the fan blower and is disintegrated in the fan blower, wherein the disintegrated foam is led via a separator into a collection container, and wherein the disintegrated foam is transferred from the collection container with a pump.

2. Brief Description of the Background of the Invention Including Prior Art

An air foam generating method is used in connection with fire-extinguishing foams, where water is transformed into a phase having a lower specific weight, in particular in relation to ignitable and flammable liquids. For this purpose, a foaming agent is admixed to a water stream and the foamable solution is foamed in a foam generator by drawing in of air. Foamable materials, which are employed for the formation of foam, are designated as foaming agents. These foaming agents are in part based on synthetic materials and they comprise for certain application compositions also special fluorotensides. The fluorotensides exhibit, on the one hand, an improved extinguishing effect but, on the other hand, represent difficulties in connection with waste disposal. High-expansion, medium-expansion, or low-expansion foam can be generated from a predetermined mixture of water and a corresponding foaming agent. The kinds of foam are defined according to their foaming numbers, i.e. the ratio of the volume of the unfoamed mixture relative to the volume of the generated foam. A low-expansion foam has an expansion ratio of from 4 to 20, a medium expansion foam has an expansion ratio of from 20 to 200, and a high-expansion foam has an expansion of over 200 up to 1000.

It can be recognized from this that medium-expansion foam as well as high-expansion foam result in large volumina of foam.

Fire-extinguishing foam is employed not only in case of a fire. Fire-extinguishing foam is also indispensable to generate an extinguishing foam for test purposes. Stationarily installed high-expansion foam and medium expansion foam systems require a government regulator's approval after a successful project performance involving a foam-generation test. In addition, foam carpets have to be generated in a mobile application for training purposes of fire-fighters. The taking down and removal, decomposition and disposal of large volumes of high-expansion foam or medium-expansion foam is accompanied today by substantial difficulties based on environmental protection considerations. The foaming agents, required for the generation of the foam, can in fact be biologically degraded. Nevertheless, the direct discharge of the foaming agents into the ground water or into a sewerage system or, respectively, into a water-clarifier and/or water-treatment plant, or into a sewage-treatment plant, results in a sudden change of the equilibrium present in such plant and can thus lead to an interference of the water biology and water chemistry present in such plant and, upon discharge from such plant, also in the ground water and waterways. For this purpose, statutory limiting values have been fixed various jurisdictions, which define a maximum permissible feeding of such foams per time unit into a sanitary sewer, storm sewer or other sewage system. These statutory limits cannot be guaranteed to be maintained during a waste foam disposal of test foams or in case of foams actually applied in case of a fire.

The large volumes of foam generated had to disintegrated in the past with large volumes of water. Another method comprises allowing the foam to rest and remain such that it is allowed to disintegrate and decompose by itself. However, this method requires a substantial amount of time.

It has already been proposed in the German Patent document P 3,931,311.5 and in the U.S. pending patent application, Ser. No. 07/585,244 now U.S. Pat. No. 5,127,959, to relieve and separate the foam by way of a fan blower in a rebound chamber and in a following pump from a large part of its air, such that it exhibits a foam expansion factor of less than 4. Such an apparatus is relatively expensive due substantial equipment requirements.

SUMMARY OF THE INVENTION

1. Purposes of the Invention

It is object of the present invention to generate a method and a device which allows to transform high-expansion foam and medium-expansion foam within a short time span, without large expenditures and environmentally sound, into a pumpable solution of a small volume, where a foam expansion factor of less than 4 prevails.

It is another object of the present invention to provide a mobile system capable of removing fire-extinguishing foam and transforming the foam into a fluid suitable for discharge purposes.

It is yet another object of the present invention to provide an effective method of eliminating foam generated in connection with fire-extinguishing purposes.

These and other objects and advantages of the present invention will become evident from the description which follows.

2. Brief Description of the Invention

According to the present invention there is provided for a method for the disposal of a foam comprising the following steps. A fan blower suctions the foam. An antifoaming agent water mixture is fed to the foam in a suction intake region. The mixture comprises 2.0 to 8.0 weight-percent of antifoaming agent and 92 to 98 weight-percent of water. Between 1.0 and 6.0 weight-percent of the mixture relative to the weight of the volume of the foam is fed to the foam. The foam passes through the fan blower and thereby disintegrates the foam. The disintegrated foam is fed to a separator. A phase containing a liquid is fed to a collection container. The disintegrated foam is transported from the collection container with a first pump.

The foam can be a high-expansion or a medium-expansion foam useful in connection with fire extinguishing. The mixture can be nozzled into the foam. The mixture can be nozzled into a suction connection piece of a second pump to the fan blower. The mixture can be nozzled into a suction intake side of the fan blower. The antifoaming agent can be comprised of a mixture of fatty acids, polyglycols, emulsifiers, and paraffinic oil.

According to the present invention there is provided a device for the disposal of foam, a fan blower has a suction intake region. A suction connection piece is attached to the fan blower. A suction hose is attached to the suction connection piece. A discharge connection piece is attached to the fan blower. A separator for disintegrated foam is connected to the discharge connection piece of the fan blower. A collection container is disposed sequentially following to the separator. A first pump is attached to the collection container. A container for holding an anti-foaming agent water mixture is provided. A second pump has a suction connection piece connected to the container for holding the anti-foaming agent water mixture and has an output. A feed line has a first end connected to the output of the second pump and has a second end. A nozzle is connected to the second end of the feed line and is entered into the suction intake region of the fan blower.

Means can be furnished for positioning the device completely or in part on a vehicle. The nozzle can be entered into the suction intake connection piece formed as a blending and mixing section. The nozzle can be entered into the suction-side region of the fan blower casing.

In accordance with the invention, a mixture of an antifoaming agent and of water is fed to the foam in a suction region. The mixture comprises from about 2.0 through 8.0 weight-percent of an antifoaming agent and 92 through 98 weight-percent of water. Between 1.0 and 6.0 weight-percent, and preferably about 4.0 weight-percent of the mixture relative to the liquid volume of the foam are fed to the foam.

This method transforms the foam into a solution, which can be pumped to a next processing stage without difficulties and with the simplest means for further treatment.

The present invention achieves the advantage as compared to conventional apparatus that the foam is diluted or, respectively, precipitated with only a small volume of water and, on the other hand, one can dispense with large apparatus requirements. The solution can be filled either into a container or into a tank truck for transport and further waste disposal. The tank truck can be moved to a water clarifying plant or to a sewerage plant, where the mixture is added to the sewerage plant in a metered volume as a second step. It is further possible to perform the waste disposal at the location where the foam is collected by feeding the resulting solution to a precipitation stage and/or to a filter stage, wherein foaming agent and water are separated under addition of an auxiliary flocculation agent and/or coagulation agent. The thus generated relatively pure water can be either further employed or can be discharged without difficulties into a sewer system.

The foam to be disposed of can be suctioned by a fan blower via a tube conduit. Foam generators are available in professional fire fighting units, in factory fire fighting units, and in other institutions. The non-storable foam is generated where required on the spot with these foam generators. High-expansion foam generators are furnished at the discharge port with a diffusor and with a purifier grid, which generate the foam. If the diffusor and the purifier grid are removed, as well as the air-suction opening is covered, then the generator can operate as a blower, where the separator can be mounted at the discharge port of the generator.

Starting with a device which is fully or in part mounted on a vehicle and which is furnished with a fan blower with a discharge port and with a suction tube, and where a separator is connected at the discharge port of the fan blower of said device for the disintegrated foam to a subsequently disposed collection container with pump, it is a particularly advantageous embodiment of the invention device for the performing of the disposal method that a nozzle, connected to a feed line with pump, is placed into the suction intake region arrangement of the fan blower, wherein the suction intake connection pipe of the pump is in connection with a container for the antifoaming agent water mixture.

The nozzle can be placed into the suction intake connection pipe of the fan blower or into the suction intake-side portion of the fan blower casing.

A per se known combination comprising fatty acids, polyglycols, and emulsifiers in paraffinic oils can be employed as an antifoaming agent. Alternatively, commercially available antifoaming agents can be employed.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 1 is a schematic side view of an invention apparatus;

FIG. 2 illustrates a top plan view of the feed line into the fan blower section of FIG. 1.

DESCRIPTION OF INVENTION AND PREFERRED EMBODIMENT

According to the present invention there is provided for a method for the disposal of a foam, in particular high-expansion to medium-expansion foam useful in connection with fire extinguishing. The foam is suctioned with a fan blower. The foam is passed through the fan blower and is thereby disintegrated. The disintegrated foam is fed to a collection container via a separator. The disintegrated foam is further transported from the collection container with a first pump. An antifoaming agent water mixture is fed to the foam in the suction intake region. The mixture comprises 2.0 to 8.0 weight-percent of an antifoaming agent and 92 to 98 weight-percent of water. Between 1.0 and 6.0 weight-percent of the mixture relative to the weight of the volume of the foam is fed to the foam. The mixture can be nozzled into the foam. The mixture can be nozzled into the suction connection piece to the fan blower. The mixture can be nozzled into the suction side of the fan blower. The antifoaming agent can comprise a mixture of fatty acids, polyglycols, emulsifiers, and paraffinic oil.

Furthermore, the present invention provides for a device for the disposal of foam. The device is mounted completely or in part on a vehicle and furnished with a fan blower with a suction connection piece and a suction hose. A separator for disintegrated foam is connected to a discharge connection piece of the fan blower. A collection container with a first pump is disposed sequentially following to the separator. A nozzle, connected to a feed line with a second pump, is entered into a suction intake region of the fan blower. The suction connection piece of the second pump is connected with a container for the antifoaming agent water mixture. The nozzle can be entered into the suction intake connection piece formed as a blending and mixing section. The nozzle can be entered into the suction-side region of the fan blower casing.

The device 1 for the disposal of a fire-extinguishing foam or the like comprises essentially a fan blower 2, a separator 10, a container 21 for the antifoaming agent water mixture with a pump 23 and a collection container 13 with a pump 14.

The fan blower 2 with its rotor 3 is driven by a motor 4. The motor 4 and the rotor 3 are disposed on a common shaft 5. The fan blower 2 is attached to a first end of a suction intake connection hose 6 having a second end connected to a first end of a mixing and blending section 7. A tube 8 with a special suction device is connected to a second end of the mixing and blending section 7. A discharge connection hose 9 has a second end connected to the fan blower 2 and has a first end connected to the separator 10. The discharge connection pipe 9 forms the entrance opening 11 for the separator 10 with a lower opening 12. The collection container 13 with the pump 14 and discharge hose 15 is furnished below the separator 10 and below the lower opening 12. The collection container 13 is connected via a support device 16 with a carriage 17. The carriage 17 is mounted on top of an undercarriage 18. The fan blower 2 and the motor 4 are mounted on the carriage 17 via connection pieces 20 and a frame 19. A container 21 and pump 22 with motor 23 is further mounted on the carriage 17. The container 21 receives the antifoaming agent water mixture. A suction connection piece 24 with a sieve 25 is introduced into the container 21. A feed line 26 is introduced at the pressure side of the pump 22 into the center of the mixing and blending section 7. A nozzle 27 is furnished at the end of the feed line 26. The feed line 26 is further furnished with a control valve 28 and a manometer 29.

Alternatively, the line 26 with the nozzle 27 can also be entered at the location designated with the arrow 30 into the fan blower 2.

The collection container 13 is preferably disposed at an end part of the carriage section at a low level below the separator 10. This provides that the stability of the carriage 17 is improved due to a low center of gravity caused by the liquid residing at a low level. Furthermore, the container 13 is easily accessible to manipulation.

The container 21, comprising the antifoaming agent water mixture is preferably disposed on a side opposite to the collection container 13 of the carriage. This arrangement enhances the stability of the carriage 17 by storing the collected liquid at a first end of the carriage 17 and by storing the liquid containing the antifoaming agent at a second end of the carriage. The suction devices and the ducts for the foam are preferably disposed at a level above the collection container 13 and above the container 21 for the antifoaming agent water mixture.

The separator 10 is furnished with an opening 12, where the opening 12 leads to the collection container 13. The suction connection piece 6 is preferably disposed below the motor 4 and the shaft 5. The antifoaming agent water mixture is entered through the nozzle 27 into the mixing and blending section 7.

FIG. 2 illustrates an alternative possibility of entering the nozzle 27 into the mixing and blending section 7. In this case, the material exiting from the nozzle continues to flow in the same direction as the suctioned-in foam.

The container 13 is preferably disposed such that it can be removed as a whole from the carriage. For this purpose, the support frame 16 is furnished, which holds the container 13.

It will be understood that each of the elements described above, or two or more together, may also find a useful application in other types of methods and devices for the disposal of foam differing from the types described above.

While the invention has been illustrated and described as embodied in the context of a method and device for the disposal of foam, in particular of fire extinguishing foam, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for the disposal of a foam comprising
   sucking up the foam with a fan blower;
   feeding an antifoaming agent water mixture to the foam in a suction intake region, wherein the mixture comprises 2.0 to 8.0 weight-percent of antifoaming agent and 92 to 98 weight-percent of water, and wherein between 1.0 and 6.0 weight-percent of the mixture relative to the weight of the volume of the foam is fed to the foam;
   passing the foam through the fan blower and thereby disintegrating the foam;
   feeding the disintegrated foam to a separator;
   feeding a phase containing a liquid to a collection container; and
   transporting the disintegrated foam from the collection container with a first pump.

2. The method according to claim 1, wherein the foam is a high-expansion foam useful in connection with fire extinguishing.

3. The method according to claim 1, wherein the foam is a medium-expansion foam useful in connection with fire extinguishing.

4. A method for the disposal of a foam comprising
   suctioning the foam with a fan blower;
   feeding an antifoaming agent water mixture to the foam in a suction intake region, wherein the mixture comprises 2.0 to 8.0 weight-percent of antifoaming agent and 92 to 98 weight-percent of water, and wherein between 1.0 and 6.0 weight-percent of the mixture relative to the weight of the volume of the foam is fed to the foam;

passing the foam through the fan blower and thereby disintegrating the foam;

feeding the disintegrated foam to a separator;

feeding a phase containing a liquid to a collection container 13; and transporting the disintegrated foam from the collection container 13 with a first pump, wherein the mixture is nozzled into the foam.

5. The method according to claim 4, wherein the mixture is nozzled into a suction connection piece of a second pump to the fan blower.

6. The method according to claim 4, wherein the mixture is nozzled into a suction intake side of the fan blower.

7. A method for the disposal of a foam comprising suctioning the foam with a fan blower;

feeding an antifoaming agent water mixture to the foam in a suction intake region, wherein the mixture comprises 2.0 to 8.0 weight-percent of antifoaming agent and 92 to 98 weight-percent of water, and wherein between 1.0 and 6.0 weight-percent of the mixture relative to the weight of the volume of the foam is fed to the foam;

passing the foam through the fan blower and thereby disintegrating the foam;

feeding the disintegrated foam to a separator;

feeding a phase containing a liquid to a collection container 13; and transporting the disintegrated foam from the collection container 13 with a first pump, wherein the antifoaming agent comprises a mixture of fatty acids, polyglycols, emulsifiers, and paraffinic oil.

8. A method for the disposal of a foam, in particular high-expansion to medium-expansion foam useful in connection with fire extinguishing, where the foam is suctioned with a fan blower, where the foam is passed through the fan blower and is thereby disintegrated, wherein the disintegrated foam is fed to a collection container via a separator, and wherein the disintegrated foam is further transported from the collection container with a first pump, wherein an antifoaming agent water mixture is fed to the foam in the suction intake region, wherein the mixture comprises 2.0 to 8.0 weight-percent of an antifoaming agent and 92 to 98 weight-percent of water, and wherein between 1.0 and 6.0 weight-percent of the mixture relative to the weight of the volume of the foam is fed to the foam.

9. A method for the disposal of a foam, in particular high-expansion to medium-expansion foam useful in connection with fire extinguishing, where the foam is suctioned with a fan blower, where the foam is passed through the fan blower and is thereby disintegrated, wherein the disintegrated foam is fed to a collection container via a separator, and wherein the disintegrated foam is further transported from the collection container with a first pump, wherein an antifoaming agent water mixture is fed to the foam in the suction intake region, wherein the mixture comprises 2.0 to 8.0 weight-percent of an antifoaming agent and 92 to 98 weight-percent of water, and wherein between 1.0 and 6.0 weight-percent of the mixture relative to the weight of the volume of the foam is fed to the foam, wherein the mixture is nozzled into the foam.

10. The method according to claim 9, wherein the mixture is nozzled into the suction connection piece to the fan blower.

11. The method according to claim 9, wherein the mixture is nozzled into the suction side of the fan blower.

12. A method for the disposal of a foam, in particular high-expansion to medium-expansion foam useful in connection with fire extinguishing, where the foam is suctioned with a fan blower, where the foam is passed through the fan blower and is thereby disintegrated, wherein the disintegrated foam is fed to a collection container via a separator, and wherein the disintegrated foam is further transported from the collection container with a first pumps, wherein an antifoaming agent water mixture is fed to the foam in the suction intake region, wherein the mixture comprises 2.0 to 8.0 weight-percent of an antifoaming agent and 92 to 98 weight-percent of water, and wherein between 1.0 and 6.0 weight-percent of the mixture relative to the weight of the volume of the foam is fed to the foam, wherein the antifoaming agent comprises a mixture of fatty acids, polyglycols, emulsifiers, and paraffinic oil.

* * * * *